United States Patent
BuAbbud et al.

(10) Patent No.: US 7,917,030 B2
(45) Date of Patent: Mar. 29, 2011

(54) FIBER OPTIC COMMUNICATION SYSTEM WITH AUTOMATIC LINE SHUTDOWN/POWER REDUCTION

(76) Inventors: George BuAbbud, Shrewsbury, MA (US); Cristiano Mornatta, Legnano (IT); Peter Reeves-Hall, Northbridge, MA (US); Igor Samartsev, Friazino (RU)

( * ) Notice: Subject to any disclaimer, the term of this patent is extended or adjusted under 35 U.S.C. 154(b) by 748 days.

(21) Appl. No.: 11/998,896

(22) Filed: Dec. 3, 2007

(65) Prior Publication Data
US 2009/0142061 A1   Jun. 4, 2009

(51) Int. Cl.
*H04B 10/12* (2006.01)
*H01S 3/00* (2006.01)
*H04J 14/02* (2006.01)

(52) U.S. Cl. .................. 398/37; 398/15; 398/38
(58) Field of Classification Search ............ 398/15, 398/37, 38
See application file for complete search history.

(56) References Cited

U.S. PATENT DOCUMENTS

| | | | |
|---|---|---|---|
| 6,292,289 B1 * | 9/2001 | Sugaya et al. | 359/337 |
| 6,433,903 B1 * | 8/2002 | Barry et al. | 398/79 |
| 6,441,951 B1 * | 8/2002 | Tanaka et al. | 359/334 |
| 6,466,348 B1 * | 10/2002 | Izumi | 398/177 |
| 6,563,614 B1 * | 5/2003 | Stephens et al. | 398/5 |
| 6,603,596 B2 * | 8/2003 | Inagaki et al. | 359/341.4 |
| 6,757,099 B2 * | 6/2004 | Pavel et al. | 359/341.4 |
| 6,961,522 B1 | 11/2005 | Castagnetti et al. | |
| 7,116,471 B2 * | 10/2006 | Ghera et al. | 359/334 |
| 7,146,100 B2 * | 12/2006 | Osaka | 398/30 |
| 7,444,078 B1 * | 10/2008 | Stango et al. | 398/79 |
| 7,542,678 B2 * | 6/2009 | Raddatz | 398/83 |
| 7,657,187 B2 * | 2/2010 | Shimizu | 398/177 |
| 2004/0201882 A1 * | 10/2004 | Kikuchi | 359/341.43 |
| 2004/0208519 A1 | 10/2004 | Feldman et al. | |
| 2005/0024712 A1 * | 2/2005 | Hiraizumi et al. | 359/334 |
| 2005/0063700 A1 * | 3/2005 | Shin et al. | 398/30 |
| 2005/0089325 A1 | 4/2005 | Shan | |
| 2006/0147205 A1 | 7/2006 | Raddatz | |
| 2007/0058242 A1 * | 3/2007 | Zhou et al. | 359/337.12 |

* cited by examiner

*Primary Examiner* — Ken N Vanderpuye
*Assistant Examiner* — Danny W Leung (57) ABSTRACT

A WDM fiber optic communication system is operative to transmit WDM signals between multiple nodes. Each node has a booster EDFA, and in-band and out-of-band supervisory channels monitoring the integrity of a link by generating and detecting respective in-band and out-of-band control signals. The booster EDFA receives the multiplexed WDM and IB signals and generates an output signal carried by fibers between the nodes. The booster EDFA switches from an automatic gain control regime upon detecting of at least one of the IB and OB control signals to an automatic power control regime upon loss of both IB and OB control signals. The output signal of the EDFA in the AGC regime has a high power sufficient for transmitting the WDM and IB signals, and has a low power in the APC regime sufficient for transmitting only the IB control signal.

25 Claims, 3 Drawing Sheets

FIBER OPTIC COMMUNICATION SYSTEM WITH AUTOMATIC LINE SHUTDOWN/POWER REDUCTION

BACKGROUND OF THE INVENTION

1. Field of the Invention

The invention relates to a system for transmitting optical signals in optical fibers at long distances between locations. In particular, the invention relates to a system operative to monitor and control the integrity of transmission fibers and functionality of the system's components.

2. Prior Art Discussion

The unprecedented growth of communication services has spawned a new era of personal and business interactions. However, such an explosion has brought many challenges to the telecommunication industry to develop technology that will greatly expand the bandwidth limitations of existing communication systems. Optical communications holds great promise to meet the continual demands for greater and greater bandwidth.

In particular, Wavelength Division Multiplexing (WDM) technology, and even more specifically Dense WDM (DWDM), allows for the concurrent transmission of multiple channels over a common optical fiber. The advent of Erbium Doped Fiber Amplifiers (EDFA) has accelerated the development of WDM systems by providing a cost-effective optical amplifier that is transparent to data rate and format. EDFAs amplify all the wavelengths simultaneously, enabling the composite optical signals to travel enormous distances (e.g., up to several hundred kms) without regeneration.

Not surprisingly, the telecommunication services over WDM systems have garnered tremendous attention. Notably, the industry has focused on the design of ultra-long systems (up to thousands of kms) that are capable of transporting high number of channels without optical regeneration.

In addition to EDFAs, Distributed Raman amplification (DRA) provides very high gain across a wide range of wavelengths. DRA, thus, increases the distance between optical regeneration, while allowing for closer channel spacing. The operation of DRA involves inserting high-power laser light in the transmission fiber to amplify the WDM signals. There has been some research in deploying EDFAs in conjunction with DRAs.

As the complexity and power of optical communication systems increase, the demand for additional diagnostics and safety measure associated with the modern systems is being raised as well. It is rather customary that the power of optical signals transmitted through a fiber reaches the order of Watts. The moment there is a fiber break, which can happen due to a number of external and/or internal reasons, light is no more contained within the fiber and poses a safety hazard to field operators dealing with the maintenance of a transmission system at a variety of deployments. Meeting the heightened monitoring and safety requirements, the ITU-T provides guidelines and requirements for techniques enabling optically safe working conditions in the optical transport network. In particular, the ITU-T specifies several classes of safety ranging between safe and hazardous classes 1 and 4, respectively, with a few intermediary subclasses therebetween. In case of a hazardous situation, it is imperative that the optical power be reduced to acceptable safe power levels and even completely shutdown. The monitoring system recommended by ITU-T includes an optical supervisory channel (OSC) representing a particular interest for the scope of this disclosure. The OSC carries management information about the multi-wavelength optical signal as well as remote conditions at the optical terminal or regeneration site, it is also used for remote software upgrades and user (i.e., network operator) Network Management information Because of the high-power outputs that long-haul application requires, an automatic line shutdown and/or automatic power reduction system, further referred to as the ALS, are provided to automatically reduce the optical power and/or shutdown optical emission. When there is no fiber brake or equipment malfunction, the OSC signal of the OS channel is received at the far end by a media converter confirming, thus, the presence of link. Typically, if the signal of OSC channel is not detected, the system is automatically shut down. Yet, as one of ordinary skilled in the art readily understands, the alarm may be false and the system can quickly restore without being shutdown. Restarting the system may be a complicated process. Accordingly, the system may not be sufficiently robust.

It is, therefore, desirable to provide a long-haul optical transmission system with an automatic line shutdown (ALS) feature capable of at least partially overcoming the above-mentioned drawback of the known systems.

It is further desirable to provide a long-haul optical transmission system with an ALS feature utilizing an EDFA as a switch which operates so as to suppress a customer signal and to transmit only a control signal of in-band OS channel without additional opto-electronic components.

It is also desirable to provide a long-haul optical transmission system with an ALS feature allowing for a useful redundancy of in-band and out-of-band OS channels to discriminate between false and actual alarms and to avoid the automatic shutdown of the transmission system in response to false alarms.

It is further desirable to provide a modular long-haul optical transmission system configured with various combinations of system components that are operative to realize the ALS feature according to the present disclosure.

SUMMARY OF THE INVENTION

These and other objectives are attained by the disclosed long-haul transmission system. The disclosed system is configured with a booster having an erbium-doped fiber amplifier (EDFA) which receives and amplifies a WDM composite client signal further transmitted along an optical path. Provided in the disclosed system is an in-band optical supervisory channel (IB OSC) including a transponder which generates an in-band control signal in the same band as the client signal but at a wavelength rarely, if ever, used by the client. The client and in-band control signals are combined upstream from the EDFA within the housing of the booster. The disclosed system functions in two modes: a nominal mode and an automatic power reduction/link shutdown (ALS) mode depending on the detection of the transmitted control signal. If the control signal presents, the system continues to operate in the nominal mode in which the EDFA functions in an automatic gain control regime (AGC). The moment the control signal is not detected, the system may or may not switch to the ALS mode depending on the occurrence of certain conditions which are discussed in detail hereinbelow.

In accordance with one aspect of the disclosure, if the IB OSC's control signal is not detected and other necessary conditions occur, the EDFA is automatically switched from the AGC to an automatic power control (APC) regime. As a consequence, the system starts operating in the ALS mode. In the APC regime, the output power of the EFDA is reduced so that it is sufficient for transmitting only the control signal, which is amplified in the ALS mode of the system but still represents, for example, safety Class 1 or 1M, along the optical link for safety and diagnostic purposes. Hence, the EDFA is configured as a switch allowing the system to operate in the ALS mode with an optical power that is not health-hazardous since the control signal is a low-power signal corresponding to low-hazard Classes of safety. In contrast, the prior art systems utilizes an opto-mechanical switch. One of the advantages of the utilization of the EDFA as a switch is its high reliability and lower cost in comparison to mechanical optical switches.

The disclosed system also has a second, out-of band optical supervisory channel (OB OSC) that may operate simultaneously with the IB OSC. The OB OSC, like the IB OSC, is configured with a transponder which is operative to generate an out-of-band control signal at a wavelength in a band different from the one in which the client and in-band signals are transmitted. For example, if the in-band control signal is transmitted by modulating a wavelength belonging to the C-band (1530 nm-1565 nm), the out-of band control signal may use a wavelength in the L-band (specifically 1570 nm-1630 nm).

In accordance with a further aspect of the disclosure, the inventive system switches to the ALS mode, i.e. the EDFA is switched to the APC mode, only if both controls signals of the respective IB OSC and OB OSC channels are not detected. The use of two supervisory channels translates into the useful redundancy of the present system. If one of the OSC's is not detected at the far end of the system, the latter still operates transmitting the supervisory signal. Only if both OSC's are not detected, the client transmission is shutdown and the OSC power transmitted is reduced to a safe level.

In a further aspect of the disclosure includes the direct modulation of the pump diodes of an Er fiber laser as a transmitter of the OB OSC's control signal. If not for the direct modulation, the OB OSC would be configured with a standard semiconductor laser having its output optically amplified by an amplifier so as to have the desired output, for example, about 100 mW. In this case, the transmitter and optical amplifier represent a multi-component system which is more expensive than the directly modulated fiber laser. Accordingly, the latter system is reliable and cost-effective.

Still another aspect of the disclosure associated with the out-of-band optical supervisory channel relates to the sensitivity of the out-of-band (OB) receivers, which is very high. If the receives get too much power, they will saturate. To prevent it, the inventive system is configured with an attenuator dynamically dropping the light level to an average power and detecting the modulated signal.

The disclosed inventive system may further include one or multiple Raman lasers along the optical path. Similar to the known prior art systems, a Raman laser compensates for fiber losses by pumping an Er-doped fiber in, for example, a co-propagating direction. In addition, the system may be configured with a backward Raman laser operating in the known manner.

The forward Raman laser of the disclosed system represents still a further inventive aspect of the disclosure. If integrated in the system, the forward Raman laser works in an automatic gain control (AGC) regime even if the disclosed system is in the ALS mode. The AGC regime of the forward Raman allows for proportional amplification of all transmitted channels. Otherwise, if the forward Raman worked in a APC regime, too much power could be applied to, for example, a single channel or to the limited number of channels, if these were being transmitted. The excess of power may lead to the deterioration of system components and the distortion of signal transmission.

Another aspect of the disclosure associated with the integration of Raman laser pumps includes a combination of fused WDM couplers integrated in one housing with the forward Raman laser. One of the fused WDM couplers, an upstream coupler, is configured to combine a Raman pump light in the S-band (1400 nm to 1500 nm) with the L-Band out of band control signal. The other fused coupler is serially coupled to the output of the upstream one and configured to combine the S+C Band output with the C-Band in-band control signal.

In accordance with yet a further aspect of the disclosure, the inventive system is modular. Accordingly, the system may be configured to meet the requirements of any given client. For example, not every customer would like to have a forward Raman to aid the signal transmission. Nor every customer would want a backward Raman. As a consequence the system is designed to have a number of configuration options each including a combination of EDFA and either forward or backward or both Ramans. So if, for example, forward or backward Raman is not present, the system still is capable of multiplexing and demultiplexing the channels the system monitors. Even if both Raman pumps are not deployed, the booster is integrated with both IB OSC and OB OSC.

BRIEF DESCRIPTION OF THE DRAWINGS

The above and other features, aspects and advantages of the disclosed system will become more readily apparent from the following detailed description taken in conjunction with the drawings, in which.

DETAILED DESCRIPTION

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. The words "connect," "couple," and similar terms do not necessarily denote direct and immediate connections, but also include connections through intermediate elements or devices. In some instances, well-known structures and devices are disclosed in block-diagram form in order to avoid unnecessarily obscuring the disclosure. Although the disclosure is discussed with respect to ultra-long-haul WDM and DWDM systems, all inventive aspects have application to other types of optical communication systems.

Figure 1:
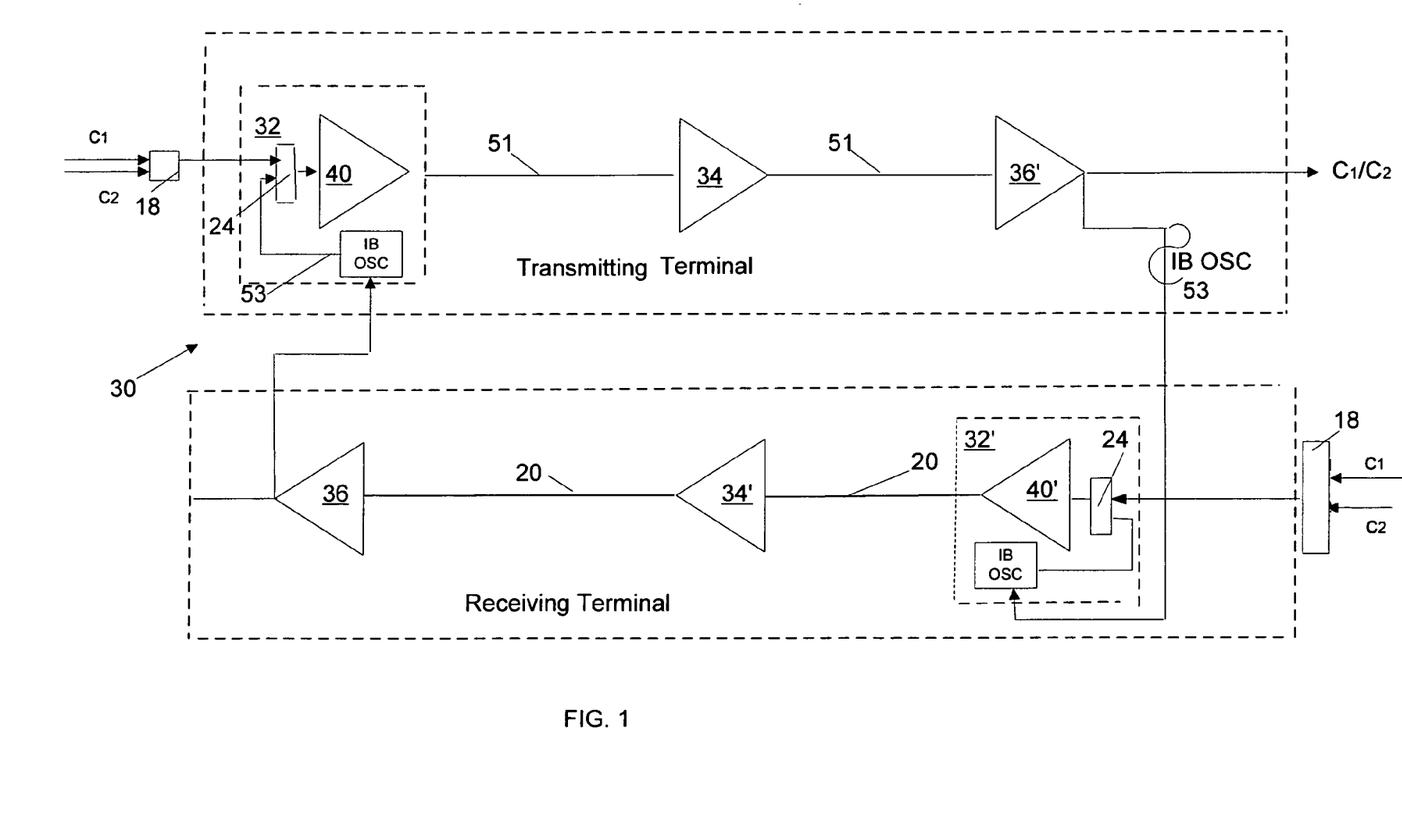
FIG. 1 is a highly diagrammatic view of a long-haul transmission system configured in accordance with the present disclosure.

FIG. 1 diagrammatically illustrates the inventive WDM fiber-optic communication system 30 providing transmission of WDM client optical signals between a plurality of spaced nodes. Shown only as an example, system 30 has transmitting/upstream and receiving/downstream nodes coupled to one another by fiber-optic links which are further referred to as an optical link.

The nodes are identically configured and each includes a booster component or gain module 32, 32' having an erbium-doped fiber booster amplifier (EDFA) 40. The nodes each may optionally have one or more forward Raman pump components 34, 34' which provide energy, i.e., compensate for losses and gain tilt accumulation in the sub-band of WDM $C_1/C_2$ channels transmittable along the optical link. In addition, the transmitting and receiving nodes/terminals each may be further provided with backward Raman pump components 36' and 36, respectively. The system 30 is illustratively shown as a closed path system, but may be configured as an open chain of the nodes. The pump energy may be launched into the optical link co-directionally with the propagation direction of client WDM signals by forward Raman (FR) component 34, 34' and/or counter-directionally the propagation direction by backward Raman (BR) 36', 30. The booster 32 alone or in combination with one or more Raman pump components is operative to transmit WDM signals from the transmitting terminal to the receiving node along fiber transmitting fiber link 51 and back along a fiber link 20. The BR 36' of the transmitting terminal is physically located at the receiving terminals and amplifies client signals $C_1/C_2$ and supervisory signals propagating along fiber link 51, whereas BR 36 amplifies the signals transmitted along reverse optical fiber link 20. The components of the transmitting/ upstream and receiving/downstream terminals are mounted on respective chassis.

Because of high-power outputs that a long-haul application requires, an automatic line shutdown and/or automatic power reduction alarm laser systems, further referred to as the ALS, are provided to automatically reduce the optical power and/or shutdown system 30. This capability of system 30 is implemented by utilizing an optical supervisory channel (IB OSC) 53, as disclosed hereinbelow. The links of the IB OSC channel provide the local information of exchange between adjacent modes of system 30. Typically, the IB OSC transmits information related to, among others, an operational status of the nodes and components associated with each node and signal levels in optical link 38 and 30 between the nodes.

In accordance with one aspect of the invention, EDFA 40 receives the combined WDM $C_1/C_2$ client signals and in-band signal, further referred to as IB control signal 53 which are multiplexed by a WDM coupler 24 upstream from the EDFA 40 in booster component 32. The client signals $C_1/C_2$ are, in turn, coupled together by a WDM coupler 18 upstream from booster 32. The reason the supervisory or control signal is referred to as in-band is that it propagates at wavelengths in the same wavelength band as the WDM or client $C_1/C_2$ signals, but in a sub-band different from the WDM signals. For example, WDM $C_1/C_2$ signals and IB signal 53 are in the C-band, but the IB control signal is generated at about 1565 nm wavelength which rarely, if ever, is used by the client.

Figure 2:
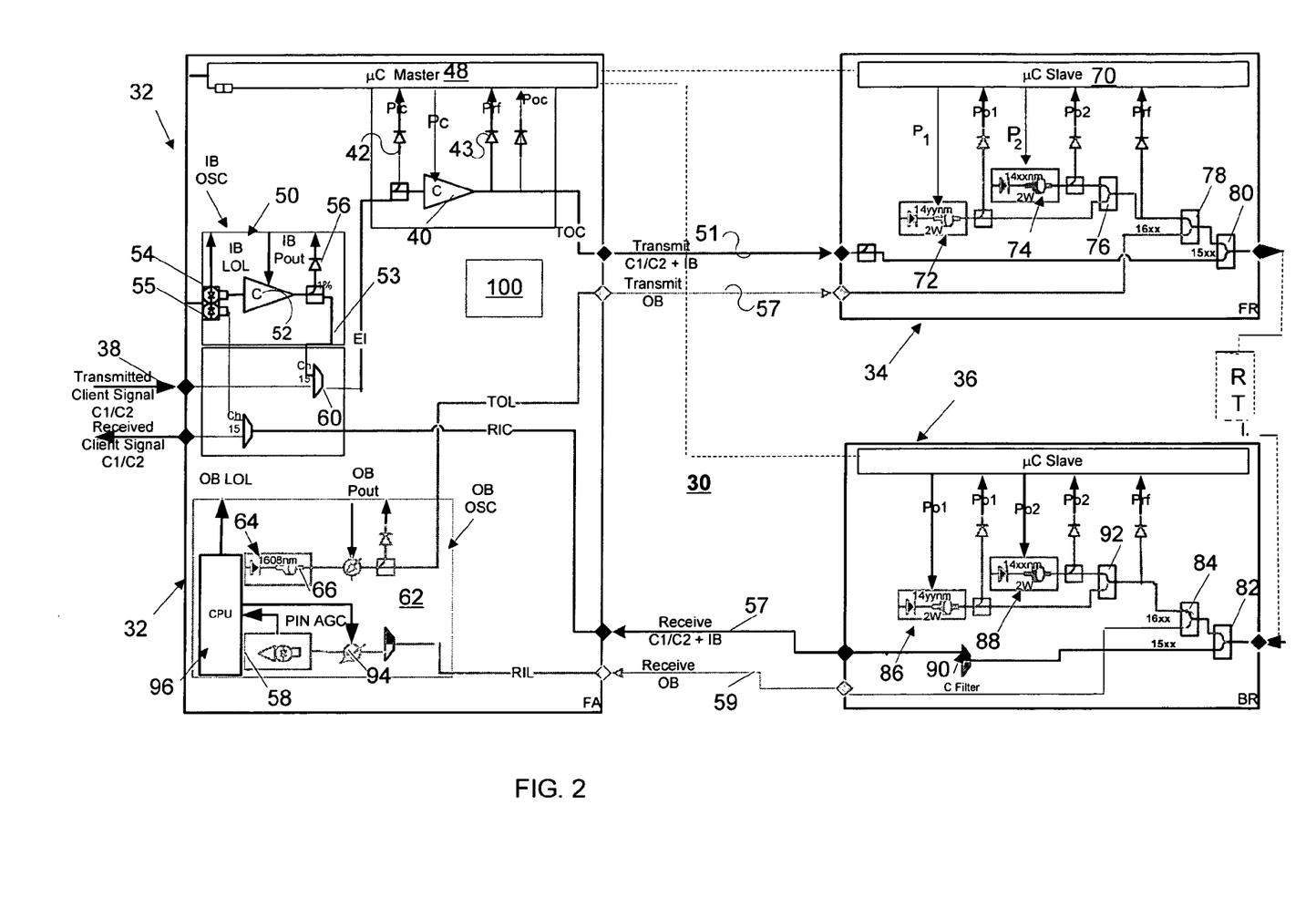
FIG. 2 is a somewhat detailed diagrammatic view of the long-haul transmission system of FIG. 1 illustrating one of multiple nodes of the system.

Referring to FIG. 2 in addition to FIG. 1, module 32 further has an input power sensor (photodiodes) P42 operative to detect an input power Pic of WDM combined $C_1/C_2$ and an in-band supervisory optical channels upstream (IB OSC) from EDFA 40, a sensor detecting the output power Poc of EDFA 40 and a backreflection sensor 43 operative to detect a backreflection signal Prf. The disclosed and other sensors, which are not shown here, are known to one of ordinary skills in the art. The sensors and EDFA 40 are coupled to a master microprocessor (µC) 48 executing software which is operative to control the operation of EDFA 40 by outputting a signal Pc in response to respective detected signals.

In accordance with another aspect of the disclosure, EDFA 40 is configured to operate in two regimes—automatic gain control (AGC) and automatic power control (APC). When no fiber break or equipment malfunction is detected, as will be explained below, EDFA 40 operates in the AGC outputting a high-power output signal—combined client signal $C_1/C_2$ and about 50 mW IB control signal—that can reach up to about 4 W (class 4).

Once an optical link between the nodes is lost, the power of the IB control signal input to the EDFA is increased up to about 100 mW, which is in order of magnitude higher than the client signals $C_1/C_2$. Simultaneously, EDFA 40 is switched to operate in the APC at a much lower fixed output power, for example, 100 mW. In this mode of operation, the EDFA amplifies only IB control signal 53 which, for instance, is increased up to about 100 mW (Class 1 or 1M), which does not jeopardize the health of the maintenance personnel working on the problem that caused the loss of the optical link. Thus, EDFA 40 switches system 30 between a nominal or normal mode which corresponds to the AGC regime of EDFA 40, and ALS or APR (automatic power reduction) mode corresponding to the APC regime of EDFA 40. When there is no fiber brake or equipment malfunction, IB control signal 53 of the IB OSC is received at the downstream terminal by the media converter/receiver confirming, thus, the presence of link causing EDFA 40 of booster 14 to operate in the AGC. Once the loss of link is detected, as will be explained below, EDFA 40 functions in the APC mode to reduce power levels of signals propagating along the optical link to lower safety classes, such as Class 1 or Class 1M, or to completely shut down the system.

The AGC is a method of producing an essentially constant output signal from an electronic circuit despite variations in the strength of the input signal. In case of WDM channels, each customer channel as well as IB control signal 53 are amplified at the same fixed gain independent of the wavelength. The APC is a means for maintaining constant output power in booster EDFA 40. The output power of the EDFA is fixed to a low level, for example 100 mW. At the reduced power of EDFA 40 and increased power of the IB OSC, the WDM client channels are suppressed and the output of EDFA 40 is sufficient only for transmitting IB signal 53 along link 51.

The in-band optical supervisory channel $C_{15}$ (IB OSC) is configured with a transponder 50 operative to generate, transmit and receive in-band IB control signal 53. The transponder 50 includes a laser-diode pumped EDFA 52 which lases IB control signal 53 in a sub-band different from the sub-band of client signals $C_1/C_2$. The output power of EDFA 52 is detected by sensor 56 operative to generate a signal electronically coupled to and processed by master processor 48. If the output power of EDFA 52 is high or low, master microprocessor 48 outputs a control signal IB Pout decreasing or increasing, respectively, the pump light provided by a plurality of laser diodes to EDFA 52. If IB control signal 53 from the downstream node is not detected by a receiver 55 of transponder 50, a transmitter 54 outputs an IB LOL (loss of link) signal received by master processor 48.

The OSC channel typically operates at a wavelength within the useful gain window of the C band. Frequently, customers in deployments put Er doped fibers in the span, and the spanned Er is not entirely transparent to the wavelength of the control signal. At low powers, if pumping of a remote piece of Er fiber is not feasible, IB control signal 53 may be heavily absorbed negating thus the usefulness of the IB OSC.

In accordance with a further aspect of the invention dealing the above-discussed problem, booster component 32 of system 30 is also provided with an out-of-band supervisory optical channel (OB OSC) 62. The OB OSC includes a transponder 64 having a laser-diode pumped fiber laser 66 operative to emit an out-of-band (OB) control signal. The transponder 64, like transponder 50 of the IB OSC, has a receiver 58 is operative to detect the OB control signal. A local micro processing unit (MPU) 96 is operative to execute a variety of operations including outputting an OB loss of link (LOL) signal which is received by master processor 48 of booster module 32, if receiver 58 does not detect the OB control signal.

In accordance with a further aspect of the disclosure, Fiber laser 66 of the OB OSC is directly modulated providing thus system 30 with improved reliability and cost-efficiency. The Fiber laser 66 is operative to generate the OB control signal in a band different from the band of client and in-bound control signals. For instance, the OB control signal is lased at about 1608 nm wavelength in the L-band. All of the wavelengths disclosed above are convenient for the purposes of the disclosed system, but can vary if a need arises.

However, the 1608 nm wavelength of the OB control signal is not incidental and adds further advantages of the disclosed system. By comparison with the 15XX nm wavelength, the advantage of 16XX nm wavelength stems from the fact that for ultra long haul spans remote Er doped fibers are installed in the fiber span and pumped remotely using 1480 nm light to provide amplification, and the spanned Er is fairly transparent to the 16XX nm wavelength. At low ALS mode powers, if pumping of a remote piece of Er fiber is not feasible, a signal at 15XX nm wavelength will be heavily absorbed. Therefore, the use of the 16XX nm wavelength allows the system to launch this signal at low powers since it bypasses the EDFA of the booster. Regardless of the number of system components, as will be discussed hereinbelow, the OB control signal is not amplified by EDFA 40 of booster component 32 and is combined with the client and IB control signals downstream from EDFA 40, as will be explained hereinbelow.

In accordance with a further aspect of the disclosure, switch-configured EDFA 40 operates in the automatic power control (APC) regime only if both the IN and OB control signals are not detected by receivers 55 and 58 of respective IN and OB transponders 50 and 64. As it happens, the transceivers generate respective IB LOL (in-band lost of link) and OB LOL signals inputted into master processor 48. In response, the software executed by processor 48 is operative to output a governing signal Pc received by EDFA 40 which switches in the APC regime. Note that if only one of the IB LOL signal and OB LOL signals is received, system 30 continues to operate in the nominal mode. The useful redundancy of the IB and OB control signals further increases the efficiency of system 30.

In a further aspect of the disclosure, FR laser pump component 34, injecting a co-propagant pump light into the fiber, operates in the automatic gain control (AGC) regime even when system 30 is in the automatic power reduction (APR) or link shutdown (ALS) modes, i.e., when switch-configured EDFA 40 functions in the APC regime. That allows system 30 to transmit a few and even a single client channel without overpowering this channel so as to obtain the desired flatness of the client signal.

The Raman amplification provides high gain across a wide range of wavelength and, thus, increases the distance between optical regeneration, while allowing closed channel spacing. Accordingly, FR laser pump component 34 has two Raman laser modules 72 and 74 each capable of emitting up to about 2 W signals at, for example, 1427 nm and 1455 nm, respectively. The wavelengths and output power are given only as an example and can vary to satisfy the needs of any given transmission system. The light generated by the Raman lasers coupled by a WDM fused coupler 76 and further injected first into the fiber 16xx carrying the OB control signal, and then into the client and IB channel 15xx. The fraction of light generated by each of Raman lasers 72 and 74, respectively, is branched to a slave processor 70 via respective output power sensors $P_{O1}$ and $P_{O2}$ where the branched lights are compared with respective reference signals. If the comparison is not satisfactory, slave processor 70 outputs governing signals $P_1$ and $P_2$ so as to modify the power of pumping laser diodes feeding the Raman lasers in a known manner. Similar to booster component 32, FR component 34 further includes a photodiode capable of detecting a backreflection Prf signal corresponding to a fiber break or component malfunction downstream from FR component 34.

A further aspect of the disclosure includes the use of fused WDM couplers 78 and 80 installed in FR component 34 and serially coupled to one another to multiplex the client, IB and OB control signals. The fused coupler 78 is configured to multiplex the output fiber from coupler 76 and the fiber 16xx carrying the OB control signal in a co-propagating direction. In downstream WDM fused coupler 80, the light from fused coupler 78 is coupled into the fiber 15xx carrying the client and IB ($C_1/C_2$+IB) signals also in the co-propagating direction. As a consequence, a delivery fiber coupled to the output of FR component 34 carries the combined client, IB and OB control signals along the transmission path/link towards a receiving terminal RT.

Alternatively, a filter-based device may be utilized instead of fused WDM couplers; however, the filter-based device has a much worse power handling capability Still a further alternative to the fused WDM couplers is fiber grating; yet the use of the gratings also requires similar components to the filter based devices and thus are suffer the same reliability problems.

The BR pump component 36 is located in the receiving terminal and receives the $C_1/C_2$+IB+OB control signals from the FR component of the transmitting terminal, as shown in FIG. 2. The BR component 36 is configured similarly to FR component 34 and have a pair of WDM fused couplers 82 and 84, which, are configured to demultiplex the $C_1/C_2$+IB control signals and the OB control signal carried by respective downstream fibers 57 and 59 toward booster component 32.

In BR pump component 36, the output fibers of respective Raman pumps 86 and 88, respectively, are coupled by a fused coupler 92, the output fiber of which, in turn, carries the combined Raman light injected in a counter-propagating direction into 15xx and 16xx fibers that carry respective client/IB and OB channels. In addition, the fiber 15xx carrying the $C_1/C_2$+IB signals is interrupted by a C filter 90 blocking any channel other than the $C_1/C_2$+IB signals from being transmitted towards the output of booster 32. Two output fibers 57 and 59, respectively, carrying respective combined $C_1/C_2$+IB signal and OB signal are coupled to booster components 32, where the IB and OB signals are further carried by respective RIC and RIL fibers. The RIC and RIL fibers are coupled to respective receivers 55 and 58 which detect the presence or absence of the respective IB and OB signals.

According to a further aspect of the disclosure, receiver 58 of the OB SOC is optimized to be extremely sensitive to work with low power levels of the OB control signal. If the power level is too low, it cannot detect the OB control signal, and the OB LOL signal is generated. Conversely, if the power level of the OB signal is too high, the receiver saturates and cannot detect the OB signal. To remedy this problem, it would be possible to feedback information along line PIN AGG to the receiver terminal RT asking to reduce the power. However, this feedback circuitry is complicated; it is easier to control the received power in the desirable working range locally. Accordingly, OB ISC channel 62 is configured with CPU 96 monitoring a constant average power to receiver 58, which generates a feedback signal along a line PIN AGG so as to adjust an optical attenuator 94 at that power level of the OB signal that would be acceptable for the receiver.

Figure 3:
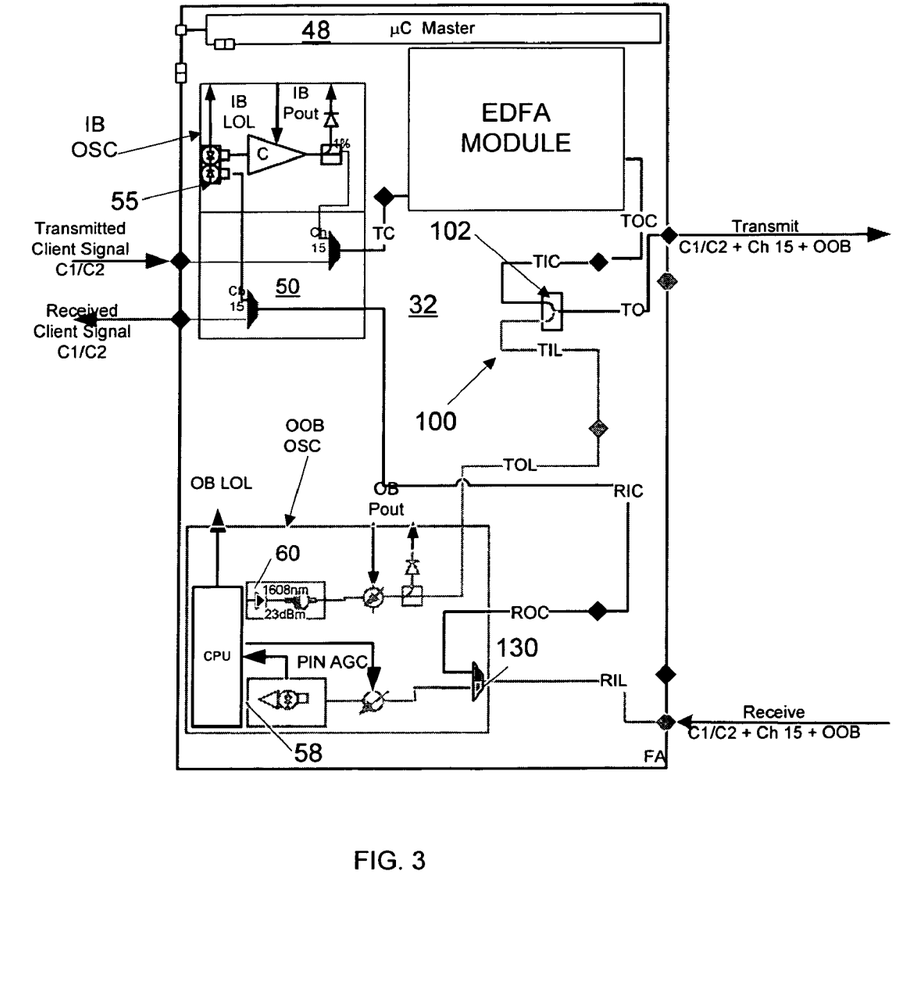
FIG. 3 is a diagrammatic view of the disclosed system of FIG. 2 configured to operate without Raman pumps.

A further aspect of the disclosure relates to the modularity of the disclosed system. Turning to FIG. 3 in addition to FIG. 2, the latter of which has system 30 configured with booster component 32, FR and BR pumps 34, 46, respectively, system 30 of FIG. 3 may have only a single component-booster 32. Alternatively, system 30 may be provided with booster component 32 and either forward Raman component 34 or backward Raman component 36, which is not shown but readily understood by one of ordinary skills in the art. If only booster component 32 is used for transmission of signals between the transmitting and receiving terminals, it has to have a connection unit operative to multiplex and demultiplex the combined signals transmitted along the transmission link within the booster.

Referring to FIG. 3, if system 30 has only booster component 32, a connecting unit 100 is in-built in the booster. The unit 100 allows booster component 32 to have all the inventive features as disclosed above in reference to FIG. 2. Thus, EDFA 40 is still switch-configured to change the modes of operation of system 30 from the nominal mode to the automatic power reduction or automatic link shutdown modes, and conversely. The IB and OB optical supervisory channels are present as well. But in contrast to the embodiment of FIG. 2 in which the multiplexing/demultiplexing operations are performed by two groups of the fused couplers located in respective FR and BR components, here it is all accomplished in single booster component 32.

A fiber RIL is coupled to the return fiber by one of its ends, whereas the other end of the RIL fiber is coupled to a de-multiplexer 130 separating the $C_1/C_2$+IB control signals from the OB control signal. The OB control signal is then detected by receiver 58 of transducer 60. The $C_1/C_2$+IB signals are carried by a fiber ROC/RIC which is connected, in turn, to receiver 55 of transducer particular, the in-band transducer 50 and out-of-band transducer 64 are operative to generate, receive and detect the IB and OB control signals, respectively. However, in contrast to the embodiment illustrated in FIG. 2, the out-of-band supervisory optical channel (OB OSC) of FIG. 3 is coupled to the client/IB SOC channels within booster component 32. For these purposes, a WDM fused coupler 102 is mounted inside booster component 32 and configured to multiplex the OB control signal carried via fibers TOL/TIL to a fiber TIC, which, in turn, is coupled to a fiber TOC carrying the composite output $C_1/C_2$+IB control signals. The output fiber TO of coupler 102, thus, carries multiple wavelengths corresponding to the client, IB and OB channels along a transmission path toward a receiving terminal. Since system 30 is without a Backward Raman pump, a single return fiber carries all three received 50. The rest of booster component 32 remains intact if compared to system 30 of FIG. 2.

back to FIGS. 1 and 2, system 30 operates as follows. The WDM client signal $C_1/C_2$ and IB control signal of the IB OSC channel are combined upstream from and further amplified by EDFA 40 of booster module 32 so as to be transmitted via single fiber 51 to FR pump component 34 where the composite $C_1/C_2$ and IB control signals are combined with the OB control signal delivered along a fiber 57 (FIG. 2). The combined $C_1/C_2$ IB+OB control signals are carried to and received in backward Raman pump 36' of FIG. 1, located in the receiving terminal, where the $C_1/C_2$ are received and IB and OB control signals are routed to the respective transducers in the EDFA booster component. A new combined client signal $C_1/C_2$ along with the IN control signal received from the transmitting terminal are then transmitted to FR. component 34' of the receiving terminal along reverse optical link 20 and further combined with the OB signal generated by the OB transducer of the receiving terminal's booster 32' (FIG. 1). The combined signals are further transmitted back to the transmitting terminal via BR pump component 36 (FIG. 2) operative to de-multiplex the combined client and IB control signals, further transmitted along fiber 57, and the OB control signal propagating along fiber 59 (FIG. 2) to booster component 32 of the transmitting terminal. If the OB control signal is detected by receiver 58 (FIG. 2) of the out-of-band optical supervisory channel 62, but the IB controls signal is not detected by transceiver 55 of IB OSC, the communication link is up and system 30 operates in the nominal mode. Alternatively, if the OB control signal is not detected, but the IB control signal is received, system 30 is still in the nominal mode and the link is up. Only if both the IB and OB control signals are not detected, master processor 48 outputs a control signal to EDFA 40 reducing its output power to the constant power level sufficient only to support the increased IB control signal, therefore switching EDFA 40 from the AGC to the APC.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

The invention claimed is:

1. An optical transmission system comprising:
    an input optical fiber carrying a first sub-band of WDM client optical signals in a first wavelength band along an optical transmission link;
    a booster EDFA coupled to the input optical fiber; and
    an in-band transponder operative to emit an in-band (IB) control signal launched into the input fiber upstream from the booster EDFA and propagating in a second sub-band of the first band, wherein the booster EDFA receives the WDM client and IB control signals and outputs a composite signal carried by an output fiber along the optical transmission link, the booster EDFA being operative to switch the optical transmission system between:
        a nominal mode corresponding to an automatic gain-control (AGC) regime of the booster EDFA in which the EDFA outputs the composite signal having a high power, and
        an automatic power reduction mode corresponding to an automatic power control (APC) regime of the booster EDFA in which the EDFA outputs the composite signal upon a loss of the optical link, wherein the composite signal in the APC regime has a low power smaller than the high power of the composite signal in AGC regime, and
    a second transponder operative to emit an out-of band (OB) control signal in a second wavelength band launched into the output fiber, the first and second transponders being operative to detect the respective IB and OB control signals in the AGG regime of the booster EDFA, the booster EDFA operating in the APC regime when both the IB and OB control signals are not detected by the respective first and second transponders.

2. The optical transmission system of claim 1 further comprising a master processor directly coupled to the booster EDFA and the first and second transponders and operative to output a control signal switching the booster EDFA to the APC mode if both the IB and OB control signals are not detected.

3. The optical transmission system of claim 1, wherein the booster amplifier operates in the AGC regime if either of the IB and OB control signals is detected by a respective one of the transponders.

4. The transmission system of claim 1, wherein the first and second transponder each include a plurality of pump diodes and a transponder EDFA, the EDFA of the second transponder being directly modulated.

5. The transmission system of claim 1, wherein the first wavelength band is the C-band, the IB signal being lased at about a 1563 nm to 1568 nm wavelength, the OB control signal being lased at about a 1600 nm to 1630 nm wavelength in the second L-band wavelength band.

6. The transmission system of claim 1, wherein the second transponder is configured with a receiver and a variable optical attenuator (VOA), the VOA being located upstream from the receiver and operative to maintain an average desirable power of the OB control signal to the receiver.

7. The transmission system of claim 1 further comprising at least one forward Raman (FR) pump component coupled to the output fiber downstream from the booster EDFA and operative to compensate for losses in the first and second wavelength bands.

8. The transmission system of claim 7, wherein the FR pump component has at least one Raman laser pump operating in an automatic gain control (AGC) regime when the booster EDFA operates in the APC regime.

9. The transmission system of claim 8, wherein the FR pump component further has:
an additional Raman laser pump operating in the AGC regime, the one and additional Raman pumps being operative to lase respective pump lights coupled to one another,
a first WDM fused coupler configured to launch the combined Raman pump lights in a co-propagating direction into an optical line carrying the OB control signal from the second transponder; and
a second WDM fused coupler downstream from and coupled to an output of the first WDM fused coupler, the second WDM fused coupler being configured to inject light from the first WDM fused coupler into the output fiber carrying the client and IB control signals in the co-propagating direction, wherein a single delivery fiber, coupled to the second WDM fused coupler, carries the combined client, IB and OB control signals along the transmission link.

10. The transmission system of claim 6 further comprising a backward Raman pump component receiving a combined client, IB and OB control signals and having a plurality of Raman laser pumps, wherein the Raman pumps are operative to inject a counter-propagating light into a delivery fiber carrying the combined client, IB and OB control signals.

11. The transmission system of claim 10, wherein the backward Raman pump component is operative to demultiplex the combined client, IB and OB control signals so that the client and IB control signals propagate along a first downstream fiber coupled to a receiver of the first transponder and the OB control signal is carried by a second downstream fiber coupled to the VOA of the second transponder.

12. A WDM modular optical communication system comprising:
a booster component coupled to a fiber and having a booster EDFA, the booster EDFA being operative to receive and amplify WDM and in-band (IB) control signals carried at respective first and second sub-bands of a first wavelength band; and
a connection unit operative to multiplex/demultiplex the amplified WDM and in-band IB control signals and a out-of-band (OB) control signal in the booster component; and
first and second transponders operative to emit the respective IB and OB control signals and detect the IB and OB control signals upon passing thereof along the fiber link, wherein the booster EDFA is coupled to the transponders and operates in an automatic gain-control regime AGC regime, in which the WDM and IB control signals are proportionally amplified so as to be transmitted along a fiber link as a high-power composite output signal if at least one of the IB and OB control signals is detected.

13. The WDM optical communication system of claim 12, wherein the OB control signal is in a second wavelength band different from the first band.

14. The WDM optical communication system of claim 12, wherein the booster EDFA is configured to operate in an automatic power control regime (APC) in which the EDFA is operative to amplify only the IB control signal so as to output a low-power output signal carried along the fiber link.

15. The WDM optical communication system of claim 13 further comprising first and second transponders operative to emit the respective IB and OB control signals and detect the IB and OB control signals upon passing thereof along the fiber link, wherein the booster EDFA is coupled to the transponders and operates in the AGC regime if at least one of the IB and OB control signals is detected.

16. The WDM communication system of claim 15, wherein the booster EDFA switches in the APC regime when both the IB and OB control signals are not detected by respective first and second transponders.

17. The WDM communication system of claim 15, wherein the first and second transponders each are configured with a receiver operative to detect a respective one of the IB and OB control signals and a transmitter operative to output an alarm signal if the receiver does not detect the one control signal.

18. The WDM communication system of claim 17, wherein the receiver of the second transponder includes a directly modulated EDFA a variable optical attenuator operative to maintain an average desirable power of the OB control signal to the receiver, the transmitter of the second transponder having a directly modulated EDFA.

19. The WDM communication system of claim 12, wherein the connection unit includes a coupler multiplexing the output signal from the EDFA and the OB control signal in the booster component, and a demultiplexer in the booster component configured to separate the OB signal from the client and IB signals.

20. The WDM communication system of claim 12 further comprising at least one forward Raman (FR) laser pump coupled to the optical link downstream from the booster component and operative to output co-propagating light to compensate for losses in the first and second wavelength sub-bands.

21. A wavelength division multiplexing (WDM) fiber optic communication system, comprising:
- a plurality of nodes interconnected by a transmission link, each node having an EDFA booster component configured with a booster EDFA;
- an in-band transponder operative to generate and detect an in-band (IB) control signal, the booster EDFA being configured to combine WDM and IB control signals and having an output coupled to the transmission link, the booster EDFA being configured to operate in:
  - an automatic gain control regime (AGC) in which the booster EDFA proportionally amplifies the WDM and IB control signals so as to have the output with a relatively high power sufficient for the WDM and IB control signal to be transmitted to a downstream node, and
  - an automatic power control regime (APC) in which the output has a relatively low constant power sufficient for transmitting only the IB control signal to the downstream node; and
- an out-of-band transponder operative to generate and detect an out-of-band (OB) control signal carried by an out-of-band fiber in a first wavelength band different from a second wavelength band of the WDM and IB control signals, wherein the WDM and IB control signals are in respective first and second sub-band of the second band.

22. The WDM system of claim 21 further comprising a master processor coupled to the booster EDFA and in- and out-of-band transponders and generating a output signal to the booster EDFA if both the IB and OB control signals are not detected, the booster EDFA switching from the AGC regime to the APC regime upon receiving the control signal.

23. The WDM system of claim 21, wherein the out-of-bound transponder includes a transmitter having a directly modulated EDFA, a receiver and a variable optical attenuator upstream from the receiver and operative to maintain an average desirable power of the OB control signal to the receiver.

24. The WDM system of claim 21 further comprising a forward Raman pump (FR) component located between the plurality of nodes, the FR component having at least one Raman pump and a pair of consecutive WDM fused couplers downstream from the Raman pump, wherein the upstream coupler multiplexes the OB control signal and Raman signals injected into a fiber carrying the OB control signal in a co-propagating direction, and the downstream coupler is operative to couple an output signal from the upstream coupler into a fiber carrying the output of the booster EDFA in the co-propagating direction.

25. A WDM modular optical communication system comprising:
- a booster component coupled to a fiber and having a booster EDFA, the booster EDFA being operative to receive and amplify WDM, out of band (OB) and in-band (IB) control signals carried at respective first and second sub-bands of a first wavelength band; and
- a connection unit located outside the booster components and operative to multiplex/de-multiplex the WDM, IB and OB control signals outside the booster component;
- at least one forward Raman (FR) and at least one backward Raman (BR) laser pumps serially coupled to the optical link downstream from the booster component and operative to output respective co-propagating and counter-propagating lights to compensate for losses in the first and second wavelength sub-bands, the connection unit having:
  - two WDM fused couplers in the FR, wherein one of the WDM fused couplers combines a Raman pump signal and the OB control signal and other WDM fused coupler combines an output signal from the one WDM coupler and the client and IB control signals, and
  - a respective pair of serially coupled WDM fused couplers in the BR operative to demultiplex signals so that the WDM client and IB control signals are carried by a first downstream fiber to the booster component and the OB control signal is carried by a second downstream fiber to the booster components.

* * * * *